US012800735B2

(12) United States Patent
Chan et al.

(10) Patent No.: US 12,800,735 B2
(45) Date of Patent: Nov. 17, 2026

(54) APPARATUS AND METHOD FOR CALIBRATING THREE-DIMENSIONAL SCANNER AND REFINING POINT CLOUD DATA

(71) Applicant: Chun Hei Chan, Hong Kong (HK)

(72) Inventors: Chun Hei Chan, Hong Kong (HK); Hok Chuen Cheng, Hong Kong (HK); Winston Sun, Hong Kong (HK); Wang Kong Lam, Hong Kong (HK); Kei Hin Ng, Hong Kong (HK)

(73) Assignee: Chun Hei Chan, Hong Kong (HK)

( * ) Notice: Subject to any disclaimer, the term of this patent is extended or adjusted under 35 U.S.C. 154(b) by 901 days.

(21) Appl. No.: 18/018,040

(22) PCT Filed: Sep. 28, 2021

(86) PCT No.: PCT/CN2021/121326
§ 371 (c)(1),
(2) Date: Jan. 26, 2023

(87) PCT Pub. No.: WO2022/068818
PCT Pub. Date: Apr. 7, 2022

(65) Prior Publication Data

US 2023/0280451 A1 Sep. 7, 2023

(30) Foreign Application Priority Data

Sep. 29, 2020 (HK) ........................... 32020017051.4

(51) Int. Cl.
*G01S 7/497* (2006.01)
*G06T 7/521* (2017.01)
*G06T 7/80* (2017.01)

(52) U.S. Cl.
CPC .............. *G01S 7/497* (2013.01); *G06T 7/521* (2017.01); *G06T 7/80* (2017.01); *G06T 2207/10028* (2013.01)

(58) Field of Classification Search
None
See application file for complete search history.

(56) References Cited

U.S. PATENT DOCUMENTS 9,619,691 B2 * 4/2017 Pang ...................... G06V 20/36
10,288,737 B2 5/2019 Mooney et al.
(Continued)

FOREIGN PATENT DOCUMENTS

WO 2018064349 A1 4/2018

OTHER PUBLICATIONS

Nolan Lunscher Deep Learning 3D Scans for Footwear Fit Estimation Jan. 2018.*
(Continued)

*Primary Examiner* — Shelby A Turner
*Assistant Examiner* — Brandon J Becker
(74) *Attorney, Agent, or Firm* — IDEA Intellectual Limited; Sam T. Yip

(57) ABSTRACT

A method for calibrating a light detection and ranging LiDAR apparatus is provided. The calibration method involves with an iteration loop. By proceeding the calibration method, an inputted point cloud is used to generate an initial point cloud matrix and compute an initial offset profile in form of a function of a range and an incident angle. The initial point cloud matrix can be refined by the initial offset profile, and then a point cloud matrix of a next iteration is generated. In the iteration loop, the refinement can be executed one or more times, and the output of the final iteration includes a final point cloud and a final offset mesh. The final point cloud can contain measured range
(Continued)

information which approach physical range information. The final offset mesh contains a function representing information about the calibration or modification to the measurement.

6 Claims, 5 Drawing Sheets

(56) References Cited

U.S. PATENT DOCUMENTS 10,634,791 B2 * 4/2020 Komeichi ............... G01S 17/89
10,723,281 B1 7/2020 Briggs
2010/0118122 A1 * 5/2010 Hartman .............. H04N 13/128
348/46
2015/0084884 A1 * 3/2015 Cherradi El Fadili ......................
G06F 3/0233
345/173
2017/0307736 A1 10/2017 Donovan
2019/0361126 A1 11/2019 Abari et al.
2019/0370614 A1 * 12/2019 Crouch .................. G06V 20/56
2020/0175754 A1 6/2020 Abe et al.

OTHER PUBLICATIONS

Robust Extrinsic Parameter Calibration of 3d LIDAR using Lie Algebres Jun. 2019 (Year: 2019).*
Nolan Lunscher, "Deep learning 3d scans for footwear fit estimation from a single depth map," MS thesis, University of Waterloo, 2018.
C. Xia et al., "Robust Extrinsic Parameter Calibration of 3D LIDAR Using Lie Algebras," 2019 IEEE Intelligent Vehicles Symposium (IV), IEEE, 2019, pp. 1775-1781.
K. Katuwandeniya et al., "Calibration of a Rotating Laser Range Finder using Intensity Features," 2018 15th International Conference on Control, Automation, Robotics and Vision (ICARCV), IEEE, 2018, pp. 228-234.
European Search Report of corresponding European Patent Application No. 21874478.7 mailed on Jul. 19, 2024.
International Search Report and Written Opinion of the corresponding PCT application No. PCT/CN2021/121326 mailed on Dec. 30, 2021.

* cited by examiner

APPARATUS AND METHOD FOR CALIBRATING THREE-DIMENSIONAL SCANNER AND REFINING POINT CLOUD DATA

FIELD OF THE INVENTION

The present invention relates to three-dimensional (3D) point cloud processing, especially to methods and apparatus for calibrating a 3D scanner and refining point cloud data.

BACKGROUND OF THE INVENTION

Light detection and ranging (LIDAR) is an optical remote sensing technique that densely scans and samples the surfaces of sensing targets. LiDAR usually employs an active optical sensor that transmits laser light (i.e. which may include laser beams, laser pulses, or combinations thereof) toward the target while moving through specific survey routes. The reflection of the laser from the target is detected and analyzed by receivers in the LIDAR sensor.

LiDAR apparatus typically includes a laser source and a scanner that directs the laser source in different directions towards a target to be imaged. Steering of the laser may be performed using a rotating material, microelectromechanical systems (MEMS), solid state scanning using silicon photonics, or other devices such as a Risley prism. The incident light is reflected from the target being scanned.

The received reflections form a three-dimensional (3D) point cloud of data, in which the data can be used in many applications, such as simultaneous localization and mapping (SLAM), building reconstruction, and road-marking extraction. Normal estimation is a fundamental task in 3D point cloud processing. Known normal estimation methods can be classified into regression-based methods, Vorono-based methods, and deep-learning methods.

However, since using the LIDAR apparatus to achieve the applications as afore-described involves measurement technology and metrology, calibration before measurement may be required. That is, the LiDAR apparatus may encounter systematic error and/or noise due to atmospheric instability, resulting in inaccurate time-of-flight (ToF) measurement offset, and hence calibration of LiDAR is required to compensate the measurement offset. Accordingly, for different applications and purposes, techniques using LiDAR apparatuses depend on calibration for reducing measurement error. Current techniques for calibration are cumbersome, which may result in labour work for acquiring data for the calibration, and rely on known parameters from a LiDAR apparatus. For example, to conduct calibration of a LiDAR apparatus, the following parameters are required; a relative position of a laser source and a receiver with respect to a LiDAR apparatus; a relative position of a calibration target with respect to a LiDAR apparatus; and geometry (e.g. size, dimension, or the likes) of a calibration target. Therefore, there is a certain degree of the labour work, such that reducing the labour work or improving the efficiency in the calibration techniques for LiDAR apparatus is needed in the art.

SUMMARY OF THE INVENTION

To improve accuracy of a LiDAR measurement, the present invention provides an apparatus and method for calibrating a LiDAR measurement, which is achieved by an approach by iteratively measuring a calibration apparatus and then refining scanner offset mesh until certain convergence criteria is fulfilled. In accordance with one aspect of the present invention, a calibration method is provided as follows. Laser light including at least one laser beam and a series of laser pulses is generated by a directional laser source. A laser source points a spot onto a three-dimensional (3D) calibration apparatus surface and moves the spot along the surface. Meanwhile the laser light is emitted from the laser source to a pointed area of the surface. A photodetector accordingly receives the reflected laser light and computes its time-of-flight (ToF), producing a point cloud structure of the calibration apparatus surface. A range measurement offset mesh with respect to a 3D scanner is generated by a calibration unit from the computed difference between a measured aperture by the 3D scanner and its actual physical aperature measured manually. An iteration index t of an iteration loop is set by the calibration unit, in which t is an integer. At the $t_{th}$ iteration, a point cloud (of a LiDAR apparatus) is generated by the calibration unit. Measurement error (i.e. error of the 3D scanner) is obtained by computing the difference between the measured and physical apertures of the LiDAR apparatus. By considering the aperture, the measurement error of the 3D scanner with respect to target range and target incident angle can be determined. A collection of this measurement offset at different range and different incident angle can be called as "offset mesh". The point cloud at $t_{th}$ iteration can be refined by subtracting the acquired offset and produce the point cloud at $(t+1)^{th}$ iteration. A new measurement error (i.e. equivalently, the offset mesh) can thus be computed and be accumulated to the old offset mesh.

In accordance with one embodiment of the present invention, in the iteration loop, the refinement is executed more than once, thereby further improving the accuracy of the LiDAR measurement.

In accordance with another embodiment of the present invention, prior to the afore-described calibration method, a test method is provided as follows. A rail including a plurality of parallel bars is placed such that the LiDAR apparatus is in front of the rail. A spacing between two of the parallel bars and a distance from the LiDAR apparatus to one of the bars are measured, so to compute and obtain physical range and incident angle information. Measured range and incident angle information is computed according to the point cloud by the calibration unit. The physical range and incident angle information and the measured range and incident angle information is compared with each other by the calibration unit, so to determine whether to execute the calibration method.

In accordance with a further embodiment of the present invention, a LiDAR system for implementing the afore-described calibration method is provided, in which the LiDAR system includes a LiDAR apparatus and a controller. the LiDAR apparatus includes a laser, a scanner, and a photodetector. The controller is electrically communicated with the LiDAR apparatus and includes a calibration unit.

By providing the calibration method, an inputted point cloud is used to generate an initial point cloud matrix (i.e. the point cloud may have a plurality of data points which are arranged in to a matrix to generate the initial point cloud matrix) and compute an initial offset profile in form of a function of a range and an incident angle. The initial point cloud matrix can be refined by the initial offset profile, and then a point cloud matrix of a next iteration is generated. In the iteration loop of the calibration method, the refinement can be executed one or more times, and the output of the final iteration includes a final point cloud and a final offset mesh. The final point cloud can contain measured range information which approach physical range information, thereby improving the range accuracy. The final offset mesh contains a function representing information about the calibration or modification to the measurement of the LiDAR apparatus.

BRIEF DESCRIPTION OF THE DRAWINGS

Embodiments of the invention are described in more detail hereinafter with reference to the drawings, in which.

DETAILED DESCRIPTION

In the following description, the apparatuses and methods for calibrating a three-dimensional (3D) scanner and refining point cloud data and the likes are set forth as preferred examples. It will be apparent to those skilled in the art that modifications, including additions and/or substitutions may be made without departing from the scope and spirit of the invention. Specific details may be omitted, so as not to obscure the invention; however, the disclosure is written to enable one skilled in the art to practice the teachings herein without undue experimentation.

Figure 1:
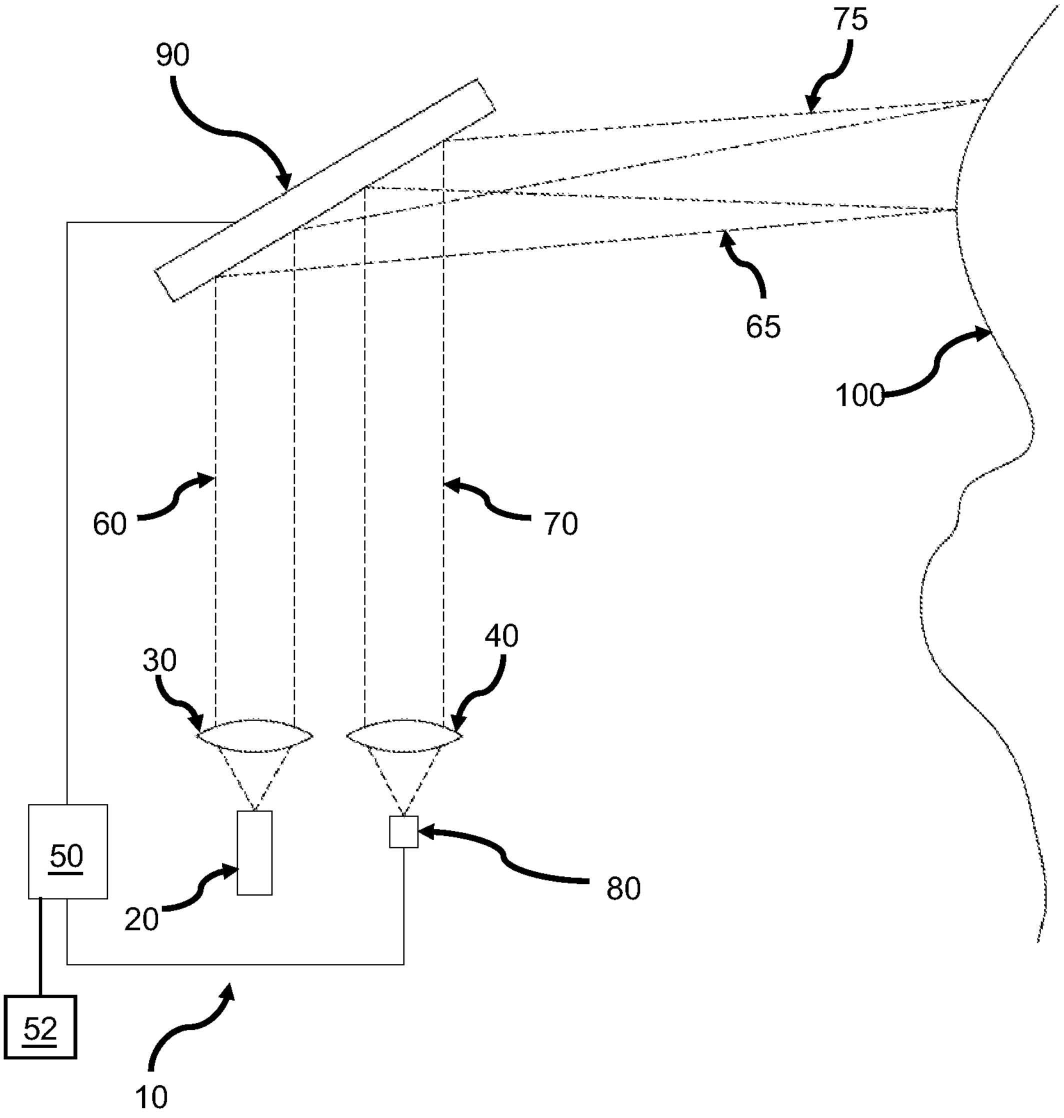
FIG. 1 depicts a LIDAR system in accordance with an embodiment of the present invention.

Referring to FIG. 1, a light detection and ranging (LiDAR) system 10 that can quantify surface flatness is depicted in accordance with an embodiment of the present invention. The LIDAR system 10 includes a laser source 20 which emits light 60, the light 60 typically passing though optics 30 such as a collimating lens. The laser 20 may be, for example, a 600-1000 nm band laser, or a 1550 nm band laser. In some embodiments, the light 60 may be laser light including laser beams, a series of laser pulses, or combinations thereof. In some embodiments, single laser source or multiple laser sources may be used. In alternative embodiments, a flash LiDAR camera may be employed.

The light 60 is incident on a scanning device 90. The scanning device 90 may be a rotating mirror (polygonal or planar), a MEMS device, a prism, or another other type of device that can scan a laser beam on the surface of a target object 100 to be scanned. Image development speed is controlled by the speed at which the target object 100 is to be scanned. The scanner beam 65 is reflected as reflected beam 75 which is directed off the scanning device 90 into beam 70 through optics 40 and into a photodetector 80. The photodetector 80 may be selected from solid-state photodetectors such as silicon avalanche photodiodes or photomultipliers, CCDs, CMOS devices etc. A controller 50 electrically communicates with laser source 20, photodiode 80, and scanning device 90 which are parts of a LiDAR apparatus, and thus an electrical communication between the controller 50 and the LiDAR apparatus is built. The controller 50 may be one or more processing devices such as one or more microprocessors, and the techniques of the present invention may be implemented in hardware software, or application-specific integrated circuitry. The controller 50 includes a calibration unit 52 which can be configured to execute a calibration process according to at least one programmable instruction stored in the controller 50.

The LIDAR system 10 generates a point cloud of data. A point cloud is a collection of data points that represents a three-dimensional shape or feature. Each point in the point cloud is associated with a color of a pixel from the image for color imaging. For measuring applications, a 3-D model from the point cloud is generated from which measurements may be taken.

According to the point cloud, the attributes of the target object 100 can be converted to coordinates along the coordinate axes. That is, each point in the point cloud can be analyzed to produce a range "r", an altitude "$\theta$", and an azimuth "$\varphi$", such that each point can be expressed as P(r, $\theta$, $\varphi$). Specifically, the range "r" (i.e. also be referred to as radius) defines a physical distance from an origin (i.e. a spot where the LiDAR system is located) to a target point. Either the altitude "$\theta$" or azimuth "$\varphi$" defines the position of a target point on a unit sphere without the range.

Accuracy of measurements using a LiDAR system may involve within that range "r" and an incident angle "$\psi$" of a laser beam traveling from the LiDAR system to a target point. Accordingly, the factors of the accuracy can be collected as a measurement offset $\delta(r, \psi)$, where $r \in [0, +\infty)$ and $\psi \in [0, \pi/2)$. In some embodiments, an offset calibration module is stored in the calibration unit 52 and can be executed to refine a point cloud obtained from measurement, thereby improving the accuracy of the measurement.

Figure 2:
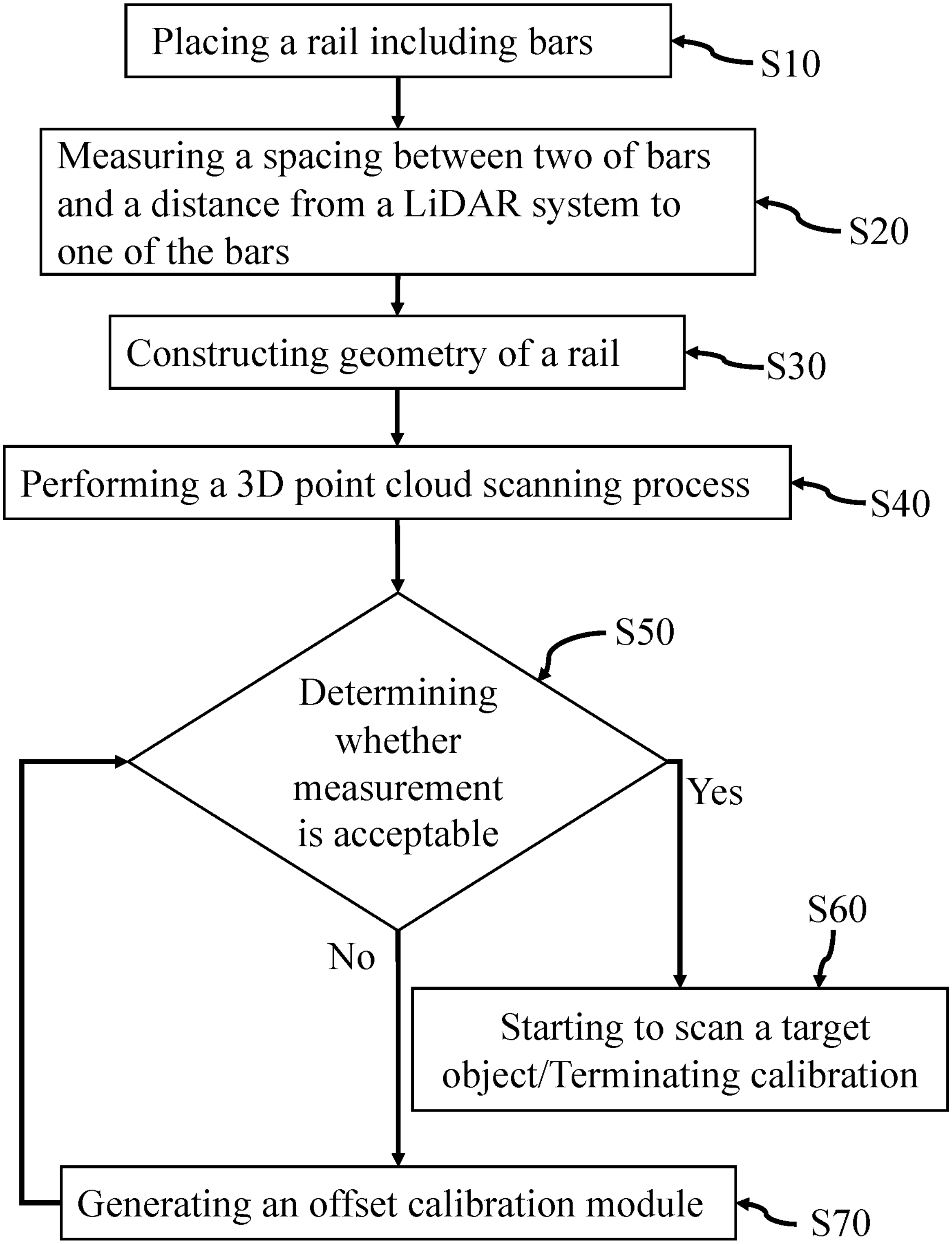
FIG. 2 is a flowchart illustrating a method of pre-processing a LiDAR system prior to performing a 3D point cloud scanning process in accordance with an embodiment of the present invention.
Figure 3:
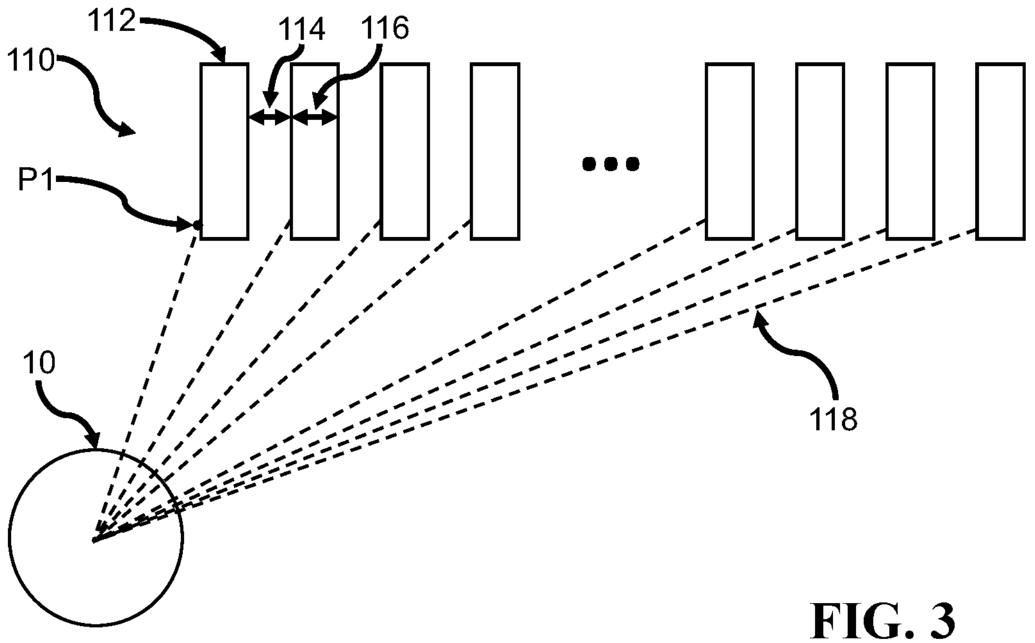
FIG. 3 illustrates a relative positional relationship between a rail and a LiDAR system in the pre-processing.

FIG. 2 is a flowchart illustrating a method of pre-processing a LiDAR system prior to performing a 3D point cloud scanning process in accordance with an embodiment of the present invention. The pre-processing method includes steps S10, S20, S30, S40, S50, S60 and S70, in which the step S10 is placing a rail including a plurality of parallel bars; the step S20 is measuring a spacing between two of the bars and a distance from a LiDAR system to one of bars; the step S30 is constructing the geometry of a rail; the step S40 is performing a 3D point cloud scanning process; the step S50 is determining whether the measurement is acceptable; the step S60 is starting to scan a target object; and the step S70 is generating an offset calibration module. Herein, the term "generating" may include generating by "updating", "refining", or "accumulating". FIG. 3 illustrates a relative positional relationship between a rail 110 and a LiDAR system 10 in the pre-processing. A LiDAR system 10 in the pre-processing may have a configuration that is similar or identical to the LiDAR system of FIG. 1.

In the step S10, a rail 110 and a LiDAR system 10 can be disposed as shown in FIG. 3. The rail 110 includes "15" bars 112 (i.e. in order not to make illustration too complex, some of the bars are omitted in the illustration) arranged in a parallel line, and the LiDAR system 10 is placed in a front of the rail 110.

In the step S20, a spacing 114 between any adjacent two of the bars 112 and a width 116 of each bar 112 can be measured. In some embodiments, the measurement is achieved by using tools with high accuracy, such as rangefinder, Vernier calipers, or rule tool. Therefore, the spacing 114 between any adjacent two of the bars 112 and the width 116 of each bar 112 are known parameters. For example, a spacing 114 between any adjacent two of the bars 112 is 0.8m. Moreover, a distance from the LiDAR system 10 to any one of the bars 112 of the rail 110 can be a known parameter. For example, the LiDAR system 10 is spaced away from the first bar (the leftmost one of the bars 112) of the rail 110 by 0.2 m which can be determined by measuring.

In the step S30, with the known parameters as described in the step S20, a distance from the LiDAR system 10 to each bar 112 of the rails 110 and an incident angle of a light beam (e.g. one of light beams 118) provided from the LiDAR system 10 with respect to each bar 112 of the rails 110 can be computed, thereby constructing a geometry configuration of the rail 110. The computed distances and incident angles can be recorded as physical range information and physical incident angle information stored in the calibration unit (e.g. the calibration unit 52 in FIG. 1), respectively. In the exemplary illustration of FIG. 3, since the number of the bars 112 of the rail 110 is "15", there would be a set of 15 data points as recorded.

In the step S40, the LiDAR system 10 can be turned on to perform a 3D point cloud scanning process with respect to the environment, which is achieved by scanning the surroundings including the bars 112 of the rail 110. By performing the scanning process, a set of measured data points with respect to the bars 112 of the rail 110 are obtained and recorded in a form as P(r, θ, φ) as previously described, in which all ranges "r" of P(r, θ, φ) can be referred to as measured range information. According to the measured data points, a measured incident angle at each bar 112 can be computed. For example, with respect to a point P1 at the first bar 112 of the rail 110, the LiDAR system 10 is located at the origin (0,0,0) in a Cartesian coordinate system; the point P1 is located at a coordinate $(x_1,y_1,z_1)$ in the same Cartesian coordinate system; and a normal vector at the point P1 can be computed from a surface constructed by points near neighborhoods of the point P1, in which such computation can be referred to as normal estimation as well. Then, an angle between a connection line from the origin (0,0,0) to the coordinate $(x_1,y_1,z_1)$ and the normal vector is computed as the measured incident angle, and all measured incident angles can be collected as measured incident angle information.

In the step S50, the measured range information is taken to compare with the physical range information, and the measured incident angle information is taken to compare with the physical incident angle information, so as to determine whether the measurement is acceptable. If the comparison result (e.g. a degree of difference between the measured and physical range information or a degree of difference between the measured and physical incident angle information) is in a desired range, it means that the measurement of the LiDAR system 10 is acceptable, and the next step following step S50 is the step S60. On the other hand, if the comparison result is outside the desired range, it means that the measurement of the LiDAR system 10 is to be calibrated or modified, and the next step following by the step S50 is the step S70.

In the step S60, since the LiDAR system 10 is determined to be acceptable, the LiDAR system 10 can be configured to perform another 3D point cloud scanning process, thereby scanning a target object for a desired purpose.

In the step S70, since the LiDAR system 10 is determined to be needing to be calibrated or modified, the calibration unit (i.e. the calibration unit 52 in FIG. 1) can generate an offset calibration using the offset calibration module in accordance with the measured data points stored therein. In some embodiments, the generation to the offset calibration is performed by or update an existing offset calibration.

Figure 4:
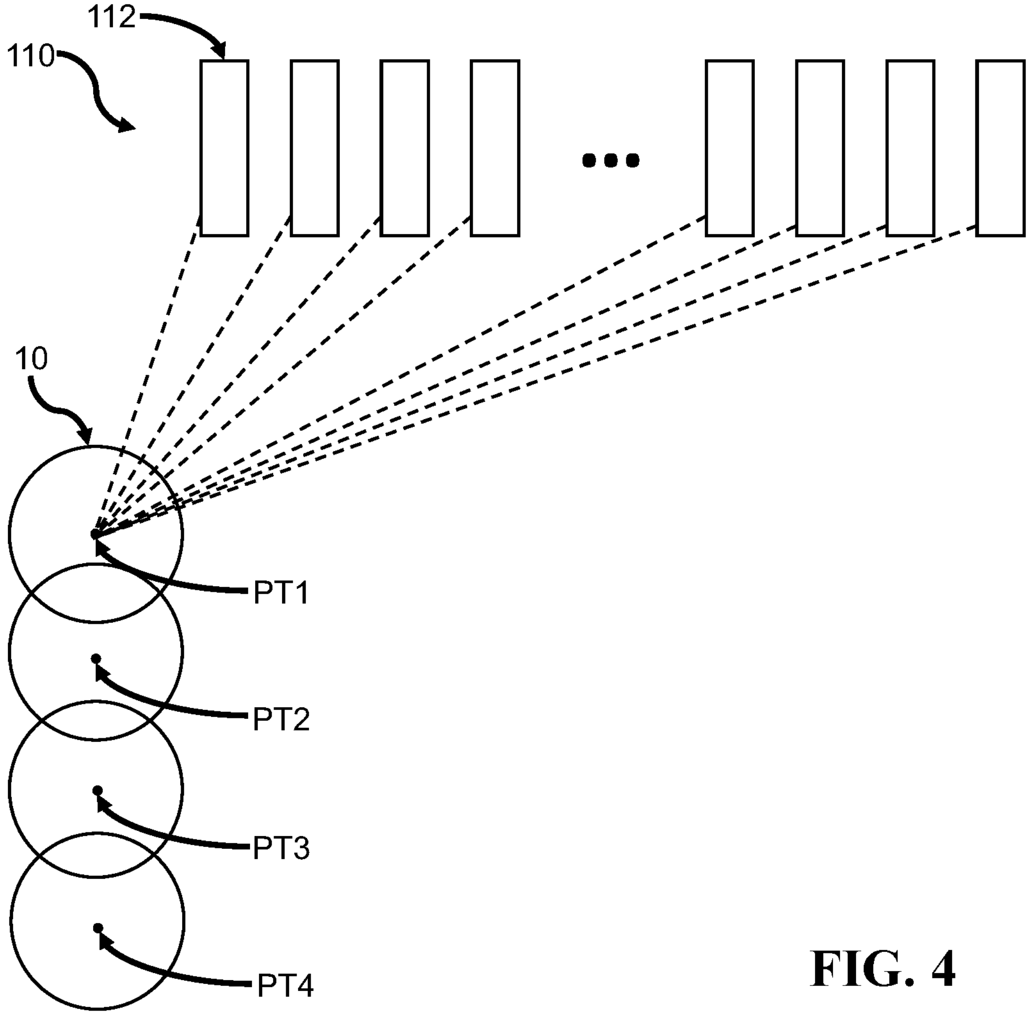
FIG. 4 is the LiDAR system located at different positions with respect to the rail in accordance with an embodiment of the present invention.

In some embodiments, the LiDAR system 10 can be shifted to different positions to perform multiple times the 3D point cloud scanning processes with respect to the rail 110 that is at the same position. For example, shown in FIG. 4 is the LiDAR system 10 located at different positions with respect to the rail 110 in accordance with an embodiment of the present invention. There are four predesignated positions for the LiDAR system 10. That is, the LiDAR system 10 can perform a 3D point cloud scanning process at a first position PT1, and then the LiDAR system 10 is shifted to a second position PT2, a third position PT3, and a fourth position PT4 to perform three times the 3D point cloud scanning processes, respectively. Herein, the term "the predesignated positions" means that a distance from the LiDAR system 10 at each position to the first bar 112 of the rail 110 is a known parameter. In this way, since 15 data points in each of the 3D point cloud scanning processes can be obtained, it will obtain 60 data points ultimately. In other words, by shifting the LiDAR system 10 to different position to perform a 3D point cloud scanning process, measured data points which can be collected as measured range and incident angle information can be sampled evenly as comprehensively as possible, which will be advantageous to further determine whether the measurement of the LiDAR system 10 is acceptable.

Figure 5:
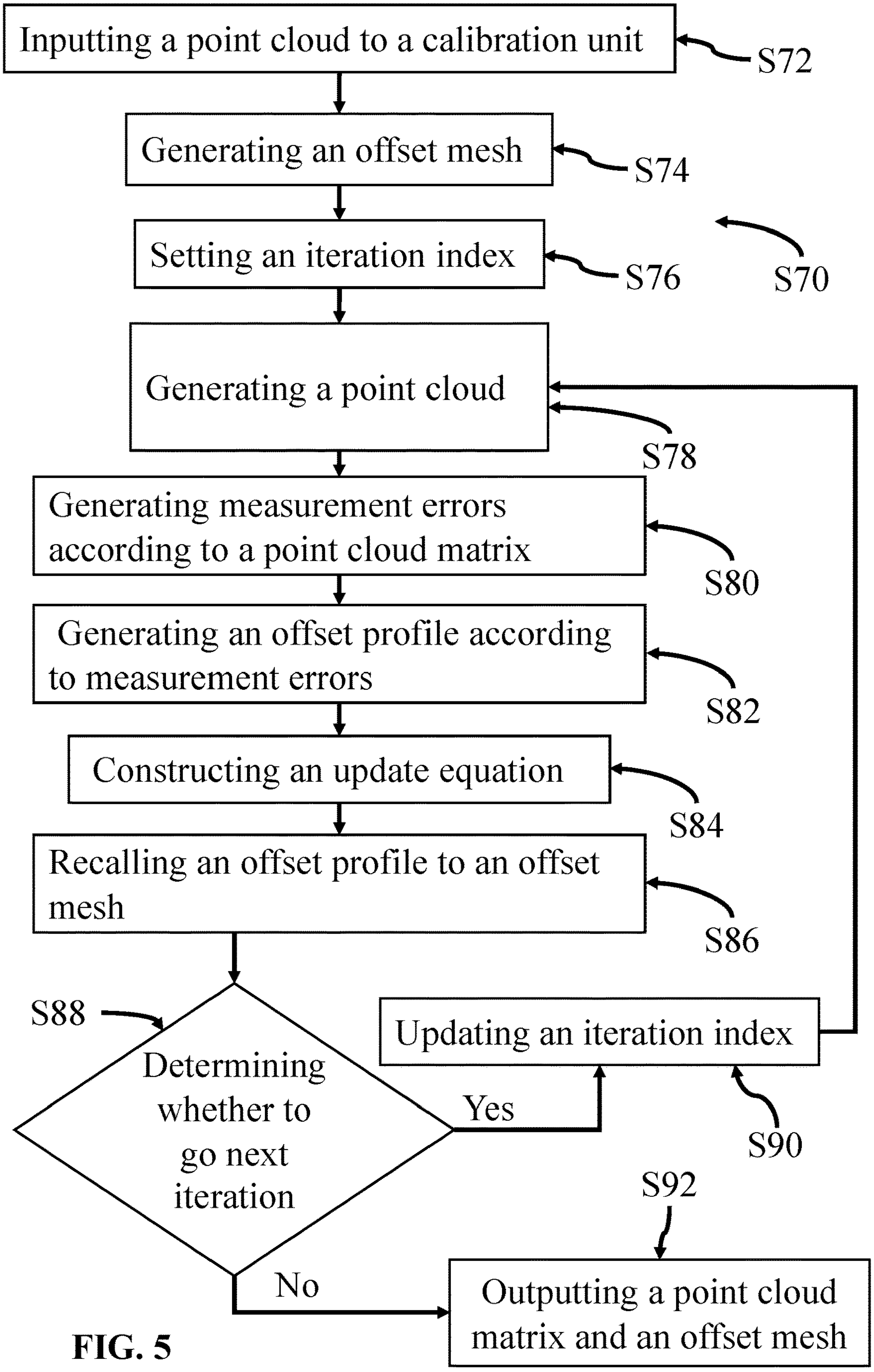
FIG. 5 illustrates a flowchart of operations for processing the step S70 in FIG. 1 to generate an offset calibration in accordance with an embodiment of the present invention.

The mechanism of generating an offset calibration module by the calibration unit is provided as follows. Reference is made to FIG. 5 illustrating a flowchart of operations for processing the step S70 in FIG. 1 to generate an offset calibration in accordance with an embodiment of the present invention. The step S70 includes operations S72, S74, S76, S78, S80, S82, S84, S86, S88, S90, and S92. The operation S72 is inputting a point cloud to a calibration unit; the operation S74 is generating an offset mesh; the operation S76 is setting an iteration index; the operation S78 is generating a point cloud; the operation S80 is generating measurement errors according to a point cloud matrix (i.e. the point cloud may have a plurality of data points which are arranged in to a matrix to generate the point cloud matrix); the operation S82 is generating an offset profile according to measurement errors; the operation S84 is constructing an equation to update the point cloud matrix; the operation S86 is recalling an offset profile to an offset mesh; the operation S88 is determining whether to go next iteration; the operation S90 is updating an iteration index; and the operation S92 is outputting a point cloud matrix and an offset mesh. In some embodiments, the operations S78 to S90 can be processed as an iteration loop, and thus the operations S78 to S90 may be processed more than once.

In the operation S72, a set of measured data points of a point cloud is inputted to the calibration unit (i.e. the calibration unit 52 in FIG. 1). In some embodiments, the controller (i.e. the controller 50 in FIG. 1) may further include a memory configured to store data to be delivered to the calibration unit. For example, after performing the 3D point cloud scanning processes by the LiDAR system (e.g. the scanning processes as afore-described in the step S40 of FIG. 2), a point cloud obtained from the scanning process and containing a set of measured data points can be stored in the memory, and then the measured data points of the point cloud can be delivered to the calibration unit in response to a computer programmable instruction.

In the operation S74, an offset mesh is generated by the calibration unit, in which the offset mesh can be updated in the follow-up operations involving with the iteration loop. In some embodiments, prior to any updating to the offset mesh, the offset mesh can be set as zero or empty to be updated.

In the operation S76, an iteration index "t" is set by the calibration unit, in which "t" is an integer. In some embodiments, the iteration index "t" starts with 0. For example, as the operations S78 to S90 collectively form the iteration loop, during a first iteration of the iteration loop, the iteration index "t" can be set as "0" (i.e. t=0), and then the iteration index "t" is brought to "t+1" (i.e. t=1) when a second iteration of the iteration loop starts.

In the operation S78, a point cloud matrix "PCL" is generated by the calibration. In some embodiment, the point cloud matrix is generated according to measured data points of a point cloud delivered from the memory. In other embodiments, the point cloud matrix is generated according to measured data points of a point cloud which is an output produced by the prior iteration. For example, the operation S78 with the iteration index "t+1" may take an output of operations S78 to S90 with the iteration index "t" as a basis to generate a point cloud matrix. Since each of the measured data points contains a range "r", an altitude "θ", and an azimuth "φ", the point cloud matrix "PCL" can be expressed as follows:

$$PCL^{(t)}=\begin{bmatrix} r_1^{(t)} & \theta_1 & \varphi_1 \\ r_2^{(t)} & \theta_2 & \varphi_2 \\ \vdots & \vdots & \vdots \\ r_N^{(t)} & \theta_N & \varphi_N \end{bmatrix}$$

where "t" is the iteration index, each of the measured data points is expressed as $(r_i, \theta_i, \varphi_i)$, and "i" is a point index of the corresponding measured data point and is defined as a positive integer from 1 to N. For example, when the operation S78 is processed in a first iteration of the iteration loop, the iteration index "t" is "0", and thus the point cloud matrix "PCL" with t=0 can be expressed as follows:

$$PCL^{(0)}=\begin{bmatrix} r_1^{(0)} & \theta_1 & \varphi_1 \\ r_2^{(0)} & \theta_2 & \varphi_2 \\ \vdots & \vdots & \vdots \\ r_N^{(0)} & \theta_N & \varphi_N \end{bmatrix}$$

In the operation of S80, according to the point cloud matrix generated in the operation S78, a measured incident angle "Ψ" with respect to each of the measured data points can be computed, and then the measured ranges and the measured incident angles of the point cloud matrix are collected to generate as measurement errors $\delta(r_i,\psi_i)$, where $r_i \in [0, +\infty)$, $\psi_i \in [0, \pi/2])$, and "i" is the same as afore defined. Since the number of the measured data points of the point cloud matrix is N, the number of the measurement errors is N as well, such as $\delta(r_1,\psi_1)$, $\delta(r_2,\psi_2)$ . . . $\delta(r_N,\psi_N)$. In some embodiments, some of the measured data points serve as transition data and may be not applied into the calculation of offset mesh.

Figure 6:
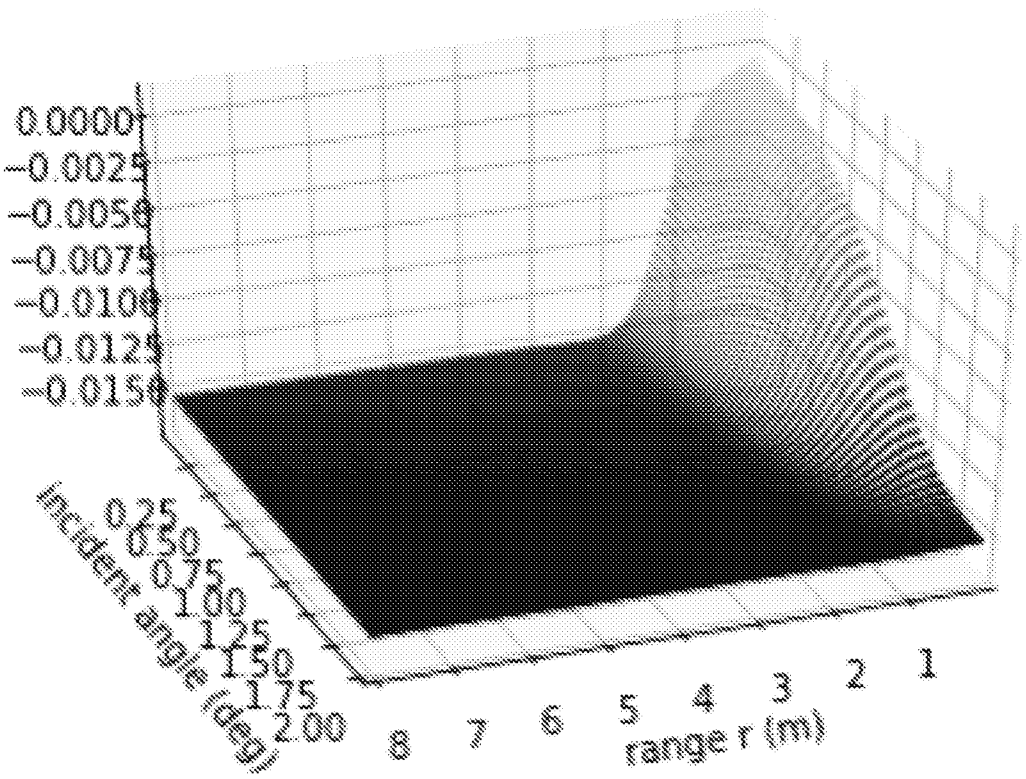
FIG. 6 shows a function $\delta_{MESH}$ (r, $\psi$) in accordance with an embodiment of the present invention.

In the operation of S82, according to the measurement errors $\delta(r_i,\psi_i)$, an offset profile can be generated by the calibration unit, in which the offset profile is a function of a measured range and a measured incident angle. That is, the offset profile can be expressed as a function $\delta_{MESH}(r, \psi)$ with using a measured range and a measured incident angle as arguments. In some embodiments, the function $\delta_{MESH}(r, \psi)$ is shown in FIG. 6, which means the function $\delta_{MESH}(r, \psi)$ can be expressed as a three-dimensional mesh. Furthermore, each of the measurement errors $\delta(r_i,\psi_i)$ serves as part of the total information of function $\delta_{MESH}(r, \psi)$, which is than generated by using statistical methods. For example, with the substituting, a set of the function $\delta_{MESH}(r, \psi)$ can be expressed as $\delta_{MESH}(r_1,\psi_1)$, $\delta_{MESH}(r_2,\psi_2)$ . . . $\delta_{MESH}(r_N,\psi_N)$. In some embodiments, the statistical methods can include interpolation, linear regression, polynomial fitting, other suitable method, or combinations thereof.

In the operation S84, an update equation is constructed by the calibration unit, in which the point cloud matrix and the offset profile with substituting the measurement errors are introduced thereto. For example, the update equation can be expressed as follows:

$$PCL^{(t+1)}=\begin{bmatrix} r_1^{(t+1)} & \theta_1 & \varphi_1 \\ r_2^{(t+1)} & \theta_2 & \varphi_2 \\ \vdots & \vdots & \vdots \\ r_N^{(t+1)} & \theta_N & \varphi_N \end{bmatrix}=\begin{bmatrix} r_1^{(t)}-\delta_{MESH}{}^{(t)}\left(r_1^{(t)},\psi_1^{(t)}\right) & \theta_1 & \varphi_1 \\ r_2^{(t)}-\delta_{MESH}{}^{(t)}\left(r_2^{(t)},\psi_2^{(t)}\right) & \theta_2 & \varphi_2 \\ \vdots & \vdots & \vdots \\ r_N^{(t)}-\delta_{MESH}{}^{(t)}\left(r_N^{(t)},\psi_N^{(t)}\right) & \theta_N & \varphi_N \end{bmatrix}$$

where "t" is the iteration index as afore defined. As the operation S84 is processed in the first iteration of the iteration loop, the iteration index "t" will be "0", and accordingly the update equation can be calculated as follows:

$$PCL^{(1)}=\begin{bmatrix} r_1^{(1)} & \theta_1 & \varphi_1 \\ r_2^{(1)} & \theta_2 & \varphi_2 \\ \vdots & \vdots & \vdots \\ r_N^{(1)} & \theta_N & \varphi_N \end{bmatrix}=\begin{bmatrix} r_1^{(0)}-\delta_{MESH}{}^{(0)}\left(r_1^{(0)},\psi_1^{(0)}\right) & \theta_1 & \varphi_1 \\ r_2^{(0)}-\delta_{MESH}{}^{(0)}\left(r_2^{(0)},\psi_2^{(0)}\right) & \theta_2 & \varphi_2 \\ \vdots & \vdots & \vdots \\ r_N^{(0)}-\delta_{MESH}{}^{(0)}\left(r_N^{(0)},\psi_N^{(0)}\right) & \theta_N & \varphi_N \end{bmatrix}$$

That is, $\delta_{MESH}{}^{(0)}(r, \psi)$ is employed for refining the $PCL^{(0)}$, so to generate $PCL^{(1)}$, and $PCL^{(1)}$ can be referred to as being dependent on $PCL^{(0)}$ and $\delta_{MESH}{}^{(0)}(r, \psi)$. In this regard, since the $\delta_{MESH}{}^{(0)}(r, \psi)$ is computed from the $PCL^{(0)}$, the $\delta_{MESH}{}^{(0)}(r, \psi)$ relates to measurement offset present in the $PCL^{(0)}$. Therefore, refining the $PCL^{(0)}$ by subtracting the $\delta_{MESH}{}^{(0)}(r, \psi)$ from the $PCL^{(0)}$ can improve the range accuracy. Furthermore, the $PCL^{(1)}$ may still have error in measured ranges from the true ranges but the error is reduced when compared to $PCL^{(0)}$, and such mechanic also can apply to future iterations.

In the step of S86, the function $\delta_{MESH}{}^{(0)}(r, \psi)$ of the offset profile used in the calculation of the update equation without substituting the measurement errors is recalled to the offset mesh, such that the offset mesh is updated by summation of the current record and the function $\delta_{MESH}{}^{(0)}(r,\psi)$.

In the step of S88, a convergence criterion can be set by the calibration unit, and the calibration unit can be further configured to determine whether to continuously find out a point cloud matrix in next iteration (i.e. a point cloud matrix labeled as $PCL^{(2)}$) according to the convergence criterion. For example, the calibration unit can be configured to compare the offset meshes before and after the updating. In some embodiments, the convergence criterion is a degree of difference between the offset meshes before and after the updating. For example, the offset meshes can be characterized by the function as "y=a/(b*exp(−dx)*ln(ex)+c", where the coefficients a, b, c, d, and e are parameters of the corresponding offset mesh. After the each iteration updating, the percentage change of the set of parameters (a,b,c,d,e) is checked, and convergence criteria is fulfilled if the percentage change is smaller than a certain threshold (e.g. a preset threshold). Then, if the comparison result is outside the convergence criterion, it will continue the iteration loop and proceed to the operation S90. Otherwise, if the comparison result is in the convergence criterion, it will end the iteration loop and proceed to the operation S92.

In the operation S90, the iteration index "t" is updated to become "t+1" by the calibration unit. For example, as the iteration loop is processed with the second iteration, the iteration index "t" becomes "1" from "0". In the iteration loop with the second iteration, $PCL^{(1)}$ produced in the first iteration is recalled, so to process the operation S78 in the second iteration (i.e. t=1).

Specifically, in the operation S80 with t=1, a measured incident angle "ψ" with respect to each data point of $PCL^{(1)}$ is computed, and then the measured ranges and the measured incident angles of $PCL^{(1)}$ are collected to generate as a set of measurement errors with t=1, labeled as $\delta^{(1)}(r_i,\psi_i)$. In the operation S82 with t=1, according to the measurement errors, an offset profile is generated and expressed as a function $\delta_{MESH}(r, \psi)$ by the calibration unit. In the operation S84 with t=1, an update equation in the second iteration is calculated as follows:

$$PCL^{(2)} = \begin{bmatrix} r_1^{(2)} & \theta_1 & \varphi_1 \\ r_2^{(2)} & \theta_2 & \varphi_2 \\ \vdots & \vdots & \vdots \\ r_N^{(2)} & \theta_N & \varphi_N \end{bmatrix} = \begin{bmatrix} r_1^{(1)} - \delta_{MESH}{}^{(1)}(r_1^{(1)}, \psi_1^{(1)}) & \theta_1 & \varphi_1 \\ r_2^{(1)} - \delta_{MESH}{}^{(1)}(r_2^{(1)}, \psi_2^{(1)}) & \theta_2 & \varphi_2 \\ \vdots & \vdots & \vdots \\ r_N^{(1)} - \delta_{MESH}{}^{(1)}(r_N^{(1)}, \psi_N^{(1)}) & \theta_N & \varphi_N \end{bmatrix}$$

similarly, $\delta_{MESH}{}^{(1)}(r, \psi)$ is employed for refining the $PCL^{(1)}$, so as to generate $PCL^{(2)}$, and $PCL^{(2)}$ can be referred to as being dependent on $PCL^{(1)}$ and $\delta_{MESH}{}^{(1)}(r, \psi)$. In the operation S86 with t=1, the function $\delta_{MESH}(r, \psi)$ used in the calculation of the update equation without substituting the measurement errors is recalled to the offset mesh, such that the offset mesh is updated again by summation of the current record and the function $\delta_{MESH}{}^{(1)}(r, \psi)$ (e.g. updated as "$0+\delta_{MESH}{}^{(0)}(r, \psi)+\delta_{MESH}{}^{(1)}(r, \psi)$"). In the step of S88 with t=1, the offset meshes before and after the updating are compared with each other according to the convergence criterion, so to determine whether to execute the next iteration (i.e. the third iteration with t=2).

If the next iteration is determined to proceed by the calibration unit, it will generate $\delta_{MESH}{}^{(2)}(r, \psi)$ to refine $PCL^{(2)}$ so as to generate $PCL^{(3)}$ and then the offset mesh is updated again by summation of the current record and the function $\delta_{MESH}{}^{(2)}(r, \psi)$. Following this approach, after every iteration, a refined $PCL^{(t+1)}$ is generated and the offset mesh is updated.

In the operation S92, $PCL^{(t+1)}$ and the offset mesh in the final iteration are outputted by the calibration unit. For example, if the iteration loop is ended at the fifth iteration (i.e. the iteration index "t" is "6"), $PCL^{(7)}$ and offset mesh updated by summing up the initial set value and $\delta_{MESH}{}^{(0)}(r, \psi)$ to $\delta_{MESH}{}^{(6)}(r, \psi)$ are outputted. The outputted $PCL^{(t+1)}$ and the offset mesh can be referred to as "final PCL" and "final offset mesh", respectively. After the operation S92, the operation S50 can be operated again, so as to determine whether the calibrated measurement is acceptable. If it is acceptable, the calibration can be regarded as completion and then the operation S60 is performed for terminating the calibration.

The final PCL contains the refined point cloud with respect to the scanned environment including the rails with the bars. With refining the point cloud, the measured range information of the final PCL can approach the physical range information as afore described, thereby improving the range accuracy. The final offset mesh contains a function representing information about the calibration or modification to the measurement (e.g. to the measured range of the measurement) of the LiDAR system. The final offset mesh can be applied to serve as an offset calibration module stored in the calibration unit, such that the calibration unit can be configured to calibrate another measurement for the same LiDAR by executing the offset calibration module. For example, when the same LiDAR system performs a new 3D point cloud scanning process, the offset calibration module can be applied to measurement of the LiDAR system to refine the measurement, thereby improving the accuracy of the LiDAR system. In other words, the offset calibration module is reusable.

The electronic embodiments disclosed herein may be implemented using general purpose or specialized computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

All or portions of the electronic embodiments may be executed in one or more general purpose or computing devices including server computers, personal computers, laptop computers, mobile computing devices such as smartphones and tablet computers.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A light detection and ranging (LiDAR) apparatus for scanning and obtaining three-dimensional (3D) measurements of target surfaces of a sensing target, comprising: a laser source configured to generate a laser light; a scanner configured to scan the laser light beam along the target surface; a photodetector configured to detect a point cloud of reflected laser light from the target surface; a controller configured to compute the 3D measurements of the target surfaces from the detected point cloud; wherein the controller is further configured to perform an iterative process of calibration and refinement to the 3D measurements, the iterative process of calibration and adjustment comprising: generating an offset mesh; setting an iteration index t of an iteration loop, wherein t is an integer; generating a point cloud matrix of a $t^{th}$ iteration; generating measurement errors of the $t^{th}$ iteration, wherein the measurement errors of the $t^{th}$ iteration comprise a set of range and incident angle information that is computed according to the point cloud matrix of the $t^{th}$ iteration; generating an offset profile of the $t^{th}$ iteration in form of a function of a range and an incident angle according to the measurement errors of the $t^{th}$ iteration; refining the point cloud matrix of the $t^{th}$ iteration by computing the difference between the range values of the point cloud matrix of the t iteration and the offset profile of the $t^{th}$ iteration with substituting the measurement errors of the $t^{th}$ iteration to obtain a point cloud matrix of a $(t+1)^{th}$ iteration, such that the point cloud matrix of the $t^{th}$ iteration have the range values different from those of the point cloud matrix of the $(t-1)^{th}$ iteration; updating the offset mesh by introducing the offset profile of the $t^{th}$ iteration thereto; determining whether to terminate the calibration and refinement iterations; and if it is determined to terminate the calibration and refinement iterations, outputting the updated offset mesh as the calibration result and the point cloud matrix of the $(t+1)^{th}$ iteration as the refined 3D measurements; else continuing the calibration and refinement iterations; and performing a new 3D point cloud scanning process by applying the updated offset mesh to refine a new 3D measurement.

2. The LiDAR apparatus of claim 1, wherein the determination of whether to terminate the calibration and refinement iterations comprising:

setting a convergence criterion; and comparing the offset meshes before and after the updating;

wherein when the comparison result meets the convergence criterion, it is determined to terminate the calibration and refinement iterations.

3. The LiDAR apparatus of claim 1, wherein the determination of whether to terminate the calibration and refinement iterations comprising:

setting a convergence criterion; and comparing the offset meshes before and after the updating;

wherein when the comparison result does not meet the convergence criterion, the iterative process of calibration and refinement continues with next iteration comprising:

generating measurement errors of the $(t+1)^{th}$ iteration, wherein the measurement errors of the $(t+1)^{th}$ iteration comprise a set of range and incident angle information that is computed according to the point cloud matrix of the $(t+1)^{th}$ iteration;

generating an offset profile of the $(t+1)^{th}$ iteration in form of a function of a range and an incident angle according to the measurement errors of the $(t+1)^{th}$ iteration;

refining the point cloud matrix of the iteration by computing the difference between the range values of the point cloud matrix of the $(t+1)^{th}$ iteration and the offset profile of the $(t+1)^{th}$ iteration with substituting the measurement errors of the $(t+1)^{th}$ iteration to obtain a point cloud matrix of a $(t+2)^{th}$ iteration, such that the point cloud matrix of the $(t+1)^{th}$ iteration have the range values different from those of the point cloud matrix of the $(t+2)^{th}$ iteration; and updating the offset mesh by introducing the offset profile of the $(t+1)^{th}$ iteration thereto.

4. The LiDAR apparatus of claim 1, wherein the point cloud of the $t^{th}$ iteration and the point cloud of the $(t+1)^{th}$ iteration have the same altitude values and the same azimuth values.

5. The LiDAR apparatus of claim 1, wherein the point cloud matrix of a first iteration is generated according to the point cloud detected by the photodetector.

6. The LiDAR apparatus of claim 1, wherein the scanner is selected from a mirror, a polygonal mirror, or a MEMS device.

* * * * *